(12) United States Patent
Ko

(10) Patent No.: US 8,093,750 B2
(45) Date of Patent: Jan. 10, 2012

(54) POWER STRIP SYSTEM

(75) Inventor: Ti-Hua Ko, Taipei (TW)

(73) Assignee: Well Shin Technology Co., Ltd., Taipei (TW)

( * ) Notice: Subject to any disclaimer, the term of this patent is extended or adjusted under 35 U.S.C. 154(b) by 211 days.

(21) Appl. No.: 12/547,486

(22) Filed: Aug. 26, 2009

(65) Prior Publication Data

US 2011/0049983 A1    Mar. 3, 2011

(51) Int. Cl.
*H02J 1/00* (2006.01)
(52) U.S. Cl. .......................................................... 307/38
(58) Field of Classification Search ....................... 307/38
See application file for complete search history.

(56) References Cited

U.S. PATENT DOCUMENTS 6,735,705 B1* 5/2004 Egbert et al. ................... 713/300
2009/0289501 A1* 11/2009 Garb ............................... 307/39

* cited by examiner

*Primary Examiner* — Rexford N Barnie
*Assistant Examiner* — Hal Kaplan

(57) ABSTRACT

A power strip system includes a master control socket, at least one subsidiary socket of which the power on/off status is decided by a current of the master control socket, a current detecting unit connected with the master control socket for detecting the current of the master control socket and sending a corresponding current signal, a control module receiving and analyzing the current signal sent by the current detecting unit and then generating a corresponding control signal, a voltage regulating module providing a regulated voltage for the control module to be used as a power supply of the control module, and a switch module including a switch device and a switching unit controlling the switch device to turn on/off the subsidiary socket according to the control signal of the control module.

4 Claims, 3 Drawing Sheets

POWER STRIP SYSTEM

BACKGROUND OF THE INVENTION

1. Field of the Invention

The present invention generally relates to a power strip system, and more particularly to a power strip system capable of reducing power consumption.

2. The Related Art

At present, a conventional power strip is provided with a plurality of sockets for various plugs of external electric appliances being inserted therein to get power, wherein some electric appliances, such as computers, have many peripheral appliances used at the same time by utilizing the power strip. If the plugs of the appliances are always inserted in the corresponding sockets of the power strip with power switches of the appliances not yet turned off, then a circuit will always be formed to continually consume power. In addition, the appliances having their plugs inserted in the power strip may shorten their life due to long-term use. So the users often need to pull out all the plugs of the appliances or turn off all the power switches of the appliances. It is inconvenient to use. Therefore, a power strip capable of saving power and easy to use is required.

SUMMARY OF THE INVENTION

An object of the present invention is to provide a power strip system which includes a master control socket, at least one subsidiary socket of which the power on/off status is decided by a current of the master control socket, a current detecting unit connected with the master control socket for detecting the current of the master control socket and sending a corresponding current signal, a control module receiving and analyzing the current signal sent by the current detecting unit and then generating a corresponding control signal, a voltage regulating module providing a regulated voltage for the control module to be used as a power supply of the control module, and a switch module including a switch device and a switching unit controlling the switch device to turn on/off the subsidiary socket according to the control signal of the control module.

As described above, the subsidiary socket of the power strip system is designed to be automatically switched on-off the power by means of the control module controlling the switch module according to the current of the master control socket. So a peripheral appliance plugged in the subsidiary socket can be automatically turned on/off only by means of turning on-off a master electric appliance plugged in the master control socket so that is convenient to use and also can save power.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
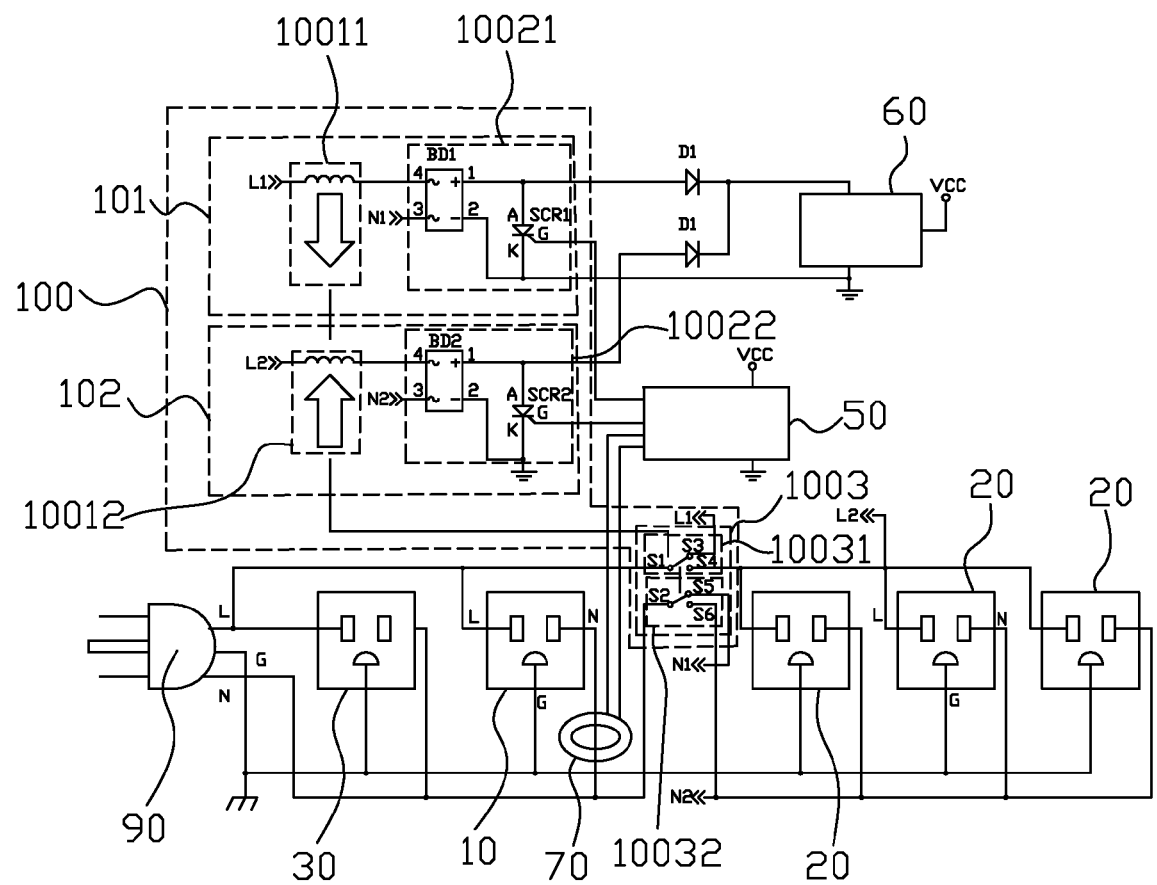
FIG. 1 is a circuitry of a power strip system according to a first embodiment of the present invention.

With reference to FIG. 1, a power strip system according to a first embodiment of the prevent invention includes a master control socket 10, a plurality of subsidiary sockets 20, an independent socket 30, a power plug 90, a current detecting unit 70, a control module 50, a voltage regulating module 60 and a switch module 100. The master control socket 10 and the independent socket 30 are respectively a general power socket in our daily life and parallel-connected with each other to the power plug 90.

The switch module 100 includes a switch device 1003, a first switching unit 101 and a second switching unit 102. The switch device 1003 is connected between the master control socket 10 and the subsidiary sockets 20, wherein the subsidiary sockets 20 are parallel-connected with one another and are controlled to get power or not by the switch device 1003 according to a current of the master control socket 10. The switch device 1003 includes a first switch 10031 and a second switch 10032. The first switch 10031 has a first constant contact S1 connected with a live wire L of the master control socket 10, a first inconstant contact S3 and a second inconstant contact S4 connected with a live wire L of each of the subsidiary sockets 20. The second switch 10032 has a second constant contact S2 connected with a neutral wire N of the master control socket 10, a third inconstant contact S5 and a fourth inconstant contact S6 connected with a neutral wire N of each of the subsidiary sockets 20.

The first switching unit 101 and the second switching unit 102 can control the switch device 1003 to turn on/off the power of the subsidiary sockets 20 by means of controlling the first constant contact S1 alternatively connected to the second or first inconstant contact S4/S3 and simultaneously the second constant contact S2 alternatively connected to the fourth or third inconstant contact S6/S5. The first switching unit 101 includes a first electromagnetic valve 10011 and a first AC-switching circuit 10021 which further includes a first bridge rectifier BD1 and a first silicon-controlled rectifier SCR1. The first bridge rectifier BD1 has 4 pins designated as Pin 1~Pin 4. One terminal of the first electromagnetic valve 10011 is connected with the first inconstant contact S3, and the other terminal thereof is connected to the Pin 4 of the first bridge rectifier BD1. The Pin 3 is connected with the third inconstant contact S5. The Pin 1 of the first bridge rectifier BD1 on one hand is connected with an anode A of the first silicon-controlled rectifier SCR1, and on the other hand is connected to the voltage regulating module 60 through a first diode D1. The Pin 2 of the first bridge rectifier BD1 and a cathode K of the first silicon-controlled rectifier SCR1 are connected with each other and further connected to ground of the voltage regulating module 60. A gate G of the first silicon-controlled rectifier SCR1 is connected to the control module 50. The second switching unit 102 has a similar circuit to the first switching unit 101, and includes a second electromagnetic valve 10012 and a second AC-switching circuit 10022 which further includes a second bridge rectifier BD2 and a second silicon-controlled rectifier SCR2. The difference between the second switching unit 102 and the first switching unit 101 is that one terminal of the second electromagnetic valve 10012 is connected with the second inconstant contact S4 and the Pin 3 of the second bridge rectifier BD2 is connected with the fourth inconstant contact S6.

Figure 2:
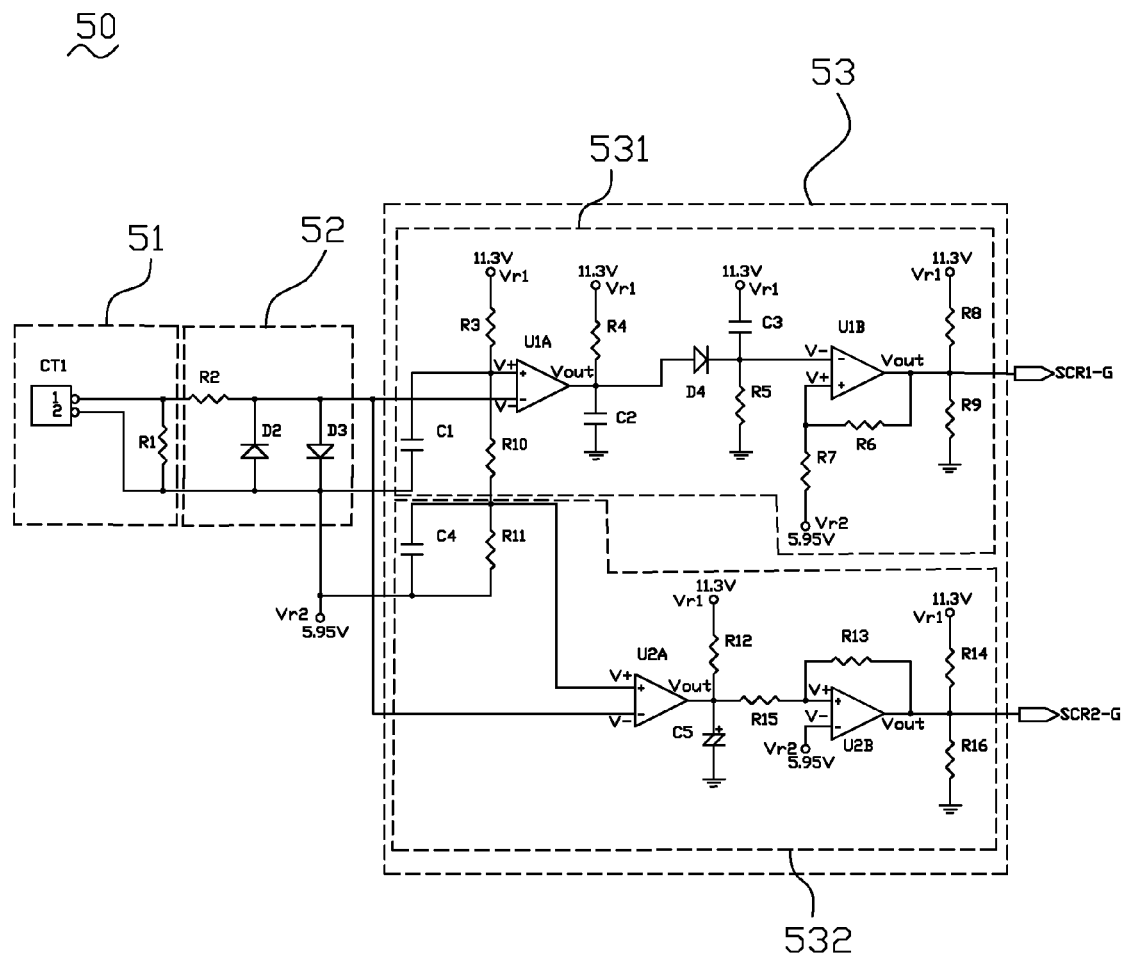
FIG. 2 is a circuitry of a control module of the power strip system of FIG. 1.

Referring to FIG. 1 and FIG. 2, the current detecting unit 70 is connected with the neutral wire N or the live wire L of the master control socket 10 for detecting the current of the master control socket 10 and generating a corresponding current signal. The control module 50 includes a signal input unit 51, a snubber circuit 52 and a control circuit 53. The signal input unit 51 is connected with the current detecting unit 70 for receiving the current signal, and then transforms the current signal into a voltage signal by means of a first resistor R1. The snubber circuit 52 is parallel-connected with the first resistor R1 and includes a second resistor R2, a second diode D2 and a third diode D3. The second diode D2 and the third diode D3 are reversely parallel-connected with each other and then are series-connected with the second resistor R2. One terminal of the first resistor R1 is connected with the second resistor R2, and the other terminal thereof is connected with the cathode of the second diode D2 and the anode of the third diode D3 and further connected with a reference voltage Vr2 of about 5.8V~6.1V generated by the voltage regulating module 60.

The control circuit 53 includes two parallel branches designated as a switch-on control unit 531 and a switch-off control unit 532. The switch-on control unit 531 includes a first comparator U1A and a second comparator U1B. A non-inverting input V+ of the first comparator U1A is connected to the anode of the third diode D3 (namely the reference voltage Vr2) through a first capacitor C1, and an inverting input V− thereof is connected with the cathode of the third diode D3. The non-inverting input V+ of the first comparator U1A is further connected to a regulated voltage Vr1 (about 11.3V) through a third resistor R3, wherein the regulated voltage Vr1 is generated by the voltage regulating module 60 and used as a power supply of the control module 50. A voltage output Vout of the first comparator U1A is connected to an inverting input V− of the second comparator U1B through a fourth diode D4. A non-inverting input V+ of the second comparator U1B is on one hand connected to a voltage output Vout thereof through a sixth resistor R6, and on the other hand connected to the reference voltage Vr2 through a seventh resistor R7. The voltage output Vout of the first comparator U1A, the inverting input V− of the second comparator U1B and the voltage output Vout of the second comparator U1B on one hand are further connected to the regulated voltage Vr1 through a fourth resistor R4, a third capacitor C3 and an eighth resistor R8 respectively, and on the other hand are further connected to ground through a second capacitor C2, a fifth resistor R5 and a ninth resistor R9 respectively. The voltage output Vout of the second comparator U1B is further connected with the gate G of the first silicon-controlled rectifier SCR1.

The switch-off control unit 532 includes a third comparator U2A and a fourth comparator U2B. A non-inverting input V+ of the third comparator U2A is on one hand connected to the non-inverting input V+ of the first comparator U1A through a tenth resistor R10, and on the other hand connected to the anode of the third diode D3 (namely the reference voltage Vr2) through an eleventh resistor R11. A fourth capacitor C4 is further parallel-connected with the eleventh resistor R11. An inverting input V− of the third comparator U2A is connected with the cathode of the third diode D3. A voltage output Vout of the third comparator U2A is connected to a non-inverting input V+ of the fourth comparator U2B through a fifteenth resistor R15. The non-inverting input V+ of the fourth comparator U2B is further connected to a voltage output Vout thereof through a thirteenth resistor R13, and an inverting input V− thereof is connected with the reference voltage Vr2. The voltage output Vout of the third comparator U2A and the voltage output Vout of the fourth comparator U2B on one hand are further connected to the regulated voltage Vr1 through a twelfth resistor R12 and a fourteenth resistor R14 respectively, and on the other hand are further connected to ground through a fifth capacitor C5 and a sixteenth resistor R16 respectively, wherein the fifth capacitor C5 is an electrolytic capacitor. The voltage output Vout of the fourth comparator U2B is further connected with a gate G of the second silicon-controlled rectifier SCR2.

In use, when a master electric appliance (not shown) is plugged in the master control socket 10 for working, the master control socket 10 has a gradually increased current therein. The control module 50 receives the current signal detected by the current detecting unit 70, and then transforms the current signal into a corresponding voltage by means of the first resistor R1, and then further compares the voltage with a potential of the non-inverting input V+ of the first comparator U1A. If the voltage is higher than the potential of the non-inverting input V+ of the first comparator U1A, then the voltage output Vout of the second comparator U1B will output a high potential to drive the first silicon-controlled rectifier SCR1 that drives the first electromagnetic valve 10011 and the first bridge rectifier BD1 to respectively control the first switch 10031 and the second switch 10032 to make the first and second constant contacts S1, S2 connect to the second inconstant contact S4 and the fourth inconstant contact S6 respectively so that the subsidiary sockets 20 get power to drive peripheral appliances (not shown) plugged therein to work. Then, the first switching unit 101 loses power so that both the first electromagnetic valve 10011 and the first bridge rectifier BD1 no longer consume the power. When the voltage on the first resistor R1 goes down to be lower than the potential of the non-inverting input V+ of the first comparator U1A, the voltage output Vout of the second comparator U1B outputs a low potential to disconnect the first silicon-controlled rectifier SCR1.

When the master electric appliance is turned off, the current in the master control socket 10 is gradually decreased. The control module 50 receives the current signal detected by the current detecting unit 70, and then transforms the current signal into a corresponding voltage by means of the first resistor R1, and further compares the voltage with a potential of the non-inverting input V+ of the third comparator U2A. If the voltage is lower than the potential of the non-inverting input V+ of the third comparator U2A, then the voltage output Vout of the fourth comparator U2B will output a high potential to drive the second silicon-controlled rectifier SCR2 that drives the second electromagnetic valve 10012 and the second bridge rectifier BD2 to respectively control the first switch 10031 and the second switch 10032 to make the first and second constant contacts S1, S2 connect to the first inconstant contact S3 and the third inconstant contact S5 respectively so as to switch off the power of the subsidiary sockets 20 to make the peripheral appliances automatically turn off. Then, the second switching unit 102 loses power so that both the second electromagnetic valve 10012 and the second bridge rectifier BD2 no longer consume the power. When the voltage on the first resistor R1 rises up to be higher than the potential of the non-inverting input V+ of the third comparator U2A, the voltage output Vout of the fourth comparator U2B outputs a low potential to make the second silicon-controlled rectifier SCR2 disconnect.

Figure 3:
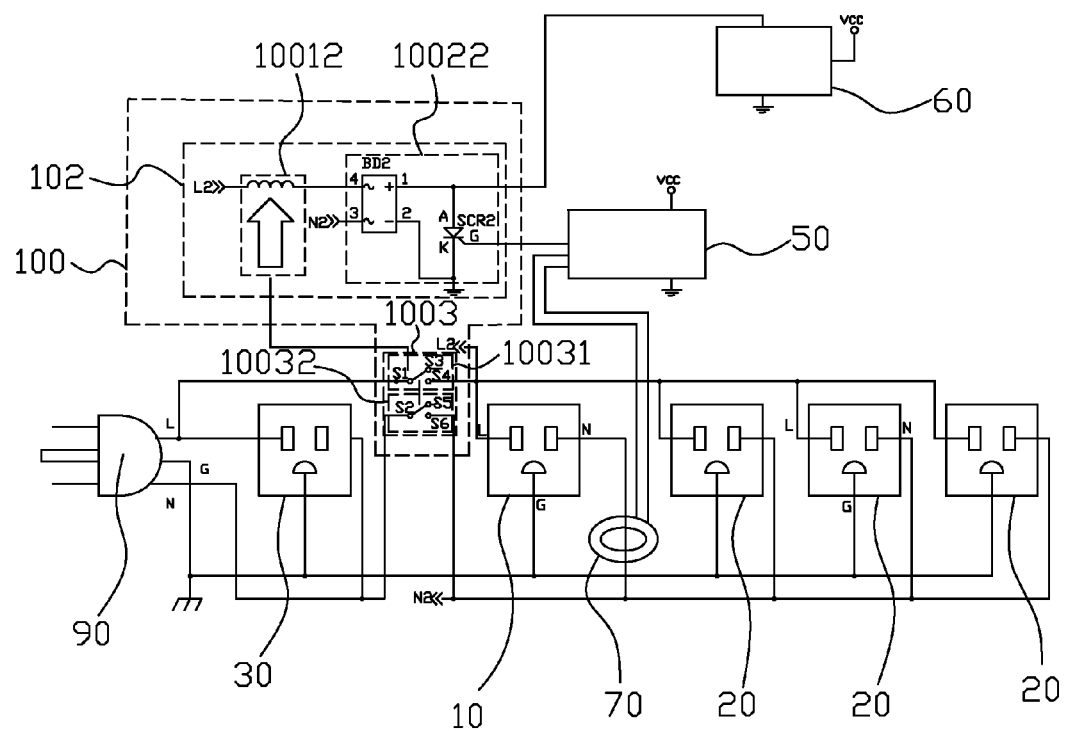
FIG. 3 is a circuitry of a power strip system according to a second embodiment of the present invention.

Referring to FIG. 3, a power strip system according to a second embodiment of the prevent invention is shown and has a similar circuit with the power strip system of the first embodiment. The difference is that the switch module 100 only includes the second switching unit 102 and the switch device 1003, and the switch device 1003 is connected between the master control socket 10 and the power plug 90, wherein the subsidiary sockets 20 each are parallel-connected with the master control socket 10. Therefore, the power strip system of the second embodiment can achieve only one semi-automatic control function of switching off the power of the subsidiary sockets 20.

As described above, the subsidiary sockets of the power strip system are designed to be automatically switched on/off the power by means of the control module 50 controlling the switch module 100 according to the current of the master control socket 10. So the peripheral appliances can be automatically turned on/off only by means of turning on/off the master electric appliance so that it will be convenient to use and also save the power. Furthermore, the electromagnetic valves 10011, 10012 need power just at the starting moment thereof to further save the power.

What is claimed is:

1. A power strip system, comprising:
    a master control socket;
    at least one subsidiary socket, the power on/off status of the subsidiary socket being decided by a current of the master control socket;
    a current detecting unit connected with the master control socket for detecting the current of the master control socket and sending a corresponding current signal according to the detected current;
    a control module receiving and analyzing the current signal sent by the current detecting unit and then generating a corresponding control signal;
    a voltage regulating module providing a regulated voltage for the control module, the regulated voltage acting as a power supply of the control module; and
    a switch module including a switch device and a switching unit controlling the switch device to turn on/off the subsidiary socket according to the control signal of the control module;
    wherein the switching unit has two parallel branches each including a bridge rectifier, an electromagnetic valve connected between the bridge rectifier and the switch device, and a silicon-controlled rectifier connected between the bridge rectifier and the control module for receiving the control signal from the control module and driving the bridge rectifier and the electromagnetic valve to turn on/off the switch device.

2. The power strip system as claimed in claim 1, wherein the control module includes a signal input unit and a control circuit, the signal input unit receives the current signal from the current detecting unit and then transforms the current signal into a voltage signal, and the control circuit analyzes the voltage signal to generate the corresponding control signal.

3. The power strip system as claimed in claim 2, wherein the control circuit has two parallel branches designated as a switch-on control unit and a switch-off control unit of which each includes two comparators series-connected with each other between the signal input unit and the switching unit, the switch-on control unit can drive the switching unit to control the switch device to turn on the power of the subsidiary socket, and the switch-off control unit can drive the switching unit to control the switch device to turn off the power of the subsidiary socket.

4. The power strip system as claimed in claim 2, wherein the control module further includes a snubber circuit connected between the signal input unit and the control circuit.

* * * * *